US010968630B1

(12) United States Patent
Dobson et al.

(10) Patent No.: US 10,968,630 B1
(45) Date of Patent: Apr. 6, 2021

(54) MODULAR CLEAN ROOM GAS SUPPLY RACEWAY APPARATUS, SYSTEM AND METHOD (71) Applicant: AES Clean Technology, Inc., Suwanee, GA (US)

(72) Inventors: Richard Dobson, Gainesville, GA (US); Ralph J Melfi, Exton, PA (US); Gilberto R Perez, Haverhill, MA (US); John M Thomas, North Hampton, NH (US)

(73) Assignee: AES Clean Technology, Inc., Montgomeryville, PA (US)

( * ) Notice: Subject to any disclaimer, the term of this patent is extended or adjusted under 35 U.S.C. 154(b) by 0 days.

(21) Appl. No.: 16/535,467

(22) Filed: Aug. 8, 2019

(51) Int. Cl.
*F24F 3/16* (2006.01)
*E04C 3/32* (2006.01)
*F16L 3/12* (2006.01)
*E04H 1/06* (2006.01)

(52) U.S. Cl.
CPC .............. *E04C 3/32* (2013.01); *F16L 3/1218* (2013.01); *E04H 1/06* (2013.01); *F24F 3/161* (2013.01)

(58) Field of Classification Search
CPC ................ F24F 3/161; F24F 7/10; E04C 3/32
See application file for complete search history.

(56) References Cited

U.S. PATENT DOCUMENTS

| | | | | |
|---|---|---|---|---|
| 4,267,769 A | * | 5/1981 | Davis | A61L 9/16 454/187 |
| 4,506,595 A | * | 3/1985 | Roberts | F24F 3/161 454/187 |
| 4,804,392 A | * | 2/1989 | Spengler | B01L 1/04 454/187 |
| 5,256,105 A | * | 10/1993 | Austin | F24F 3/161 454/187 |
| 5,645,480 A | * | 7/1997 | Spengler | F24F 3/161 454/187 |
| 5,664,995 A | * | 9/1997 | O'Keefe | B08B 15/023 454/58 |
| 6,048,499 A | * | 4/2000 | Hirayama | A61L 9/122 422/121 |

(Continued)

FOREIGN PATENT DOCUMENTS

| | | | | |
|---|---|---|---|---|
| GB | 2289531 A | * | 11/1995 | F24F 3/161 |
| JP | 61202027 A | * | 9/1986 | F24F 3/161 |

(Continued)

OTHER PUBLICATIONS

Won Y S, clip of KR-2018112411-A, Oct. 2018 (Year: 2018).*

*Primary Examiner* — Babajide A Demuren
(74) *Attorney, Agent, or Firm* — Robert J. Yarbrough of Lipton, Weinberger & Husick (57) ABSTRACT

The apparatus of the Invention is a modular gas utility raceway for providing gas service within a clean room. The modular utility raceway has a front face and a back face coinciding with the inside and outside surfaces of the clean room walls. The utility raceway includes a vertically-oriented box-shaped beam that is open at the top to allow escape of any leaked gas above the ceiling of the clean room for the safety of clean room occupants. A support bracket supports gas pipes and connectors and extends above the top side of the clean room ceiling and discourages a user from blocking the open top of the box-shaped beam.

18 Claims, 10 Drawing Sheets

(56) References Cited

U.S. PATENT DOCUMENTS

| | | | | |
|---|---|---|---|---|
| 2003/0045226 A1* | 3/2003 | Yokoyama | .............. | F24F 3/161 454/187 |
| 2010/0279597 A1* | 11/2010 | Cho | ......................... | F24F 7/10 454/341 |
| 2020/0088425 A1* | 3/2020 | Teoh | ..................... | F24F 5/0035 |

FOREIGN PATENT DOCUMENTS

| | | | | |
|---|---|---|---|---|
| JP | 61202029 A | * | 9/1986 | .............. F24F 3/161 |
| KR | 1020170043464 | | 10/2018 | |

* cited by examiner

MODULAR CLEAN ROOM GAS SUPPLY RACEWAY APPARATUS, SYSTEM AND METHOD

I. BACKGROUND OF THE INVENTION

A. Field of the Invention

The Invention is a modular component of a clean room, such as a clean room for use in pharmaceutical research and production. The Invention is a modular, vertically-oriented utility raceway that incorporates gas delivery systems into the wall of the clean room, hiding the gas piping and providing ease and flexibility of use, installation, repair and modification. The Invention is also a method of constructing a clean room using the modular gas utility raceway of the Invention and a clean room system including the modular gas utility raceway of the Invention.

B. Statement of the Related Art

Clean rooms are used to control the environment and prevent contamination of product, equipment, materials and processes in the pharmaceutical, biotechnology, life sciences and technology industries. A clean room may take the form of a building-within-a-building, with a clean room envelope within a larger building envelope. The larger building protects the clean room from the elements, contains mechanical systems serving the clean room and may provide structural support to the clean room. The clean room provides a discrete space in which the operator can separately control the temperature, humidity, cleanliness and air pressure.

In general, a clean room is manufactured in a factory and the completed components of the clean room are transported to the installation site for assembly. The clean room generally will include walls and a ceiling composed of opposing composite panels having steel skins bonded to an aluminum honeycomb core. For reduced weight and cost, the composite panels are constructed to be as thin as possible, consistent with the structural requirements of the ceiling and walls.

For uses in which avoiding biological contamination is a priority, the clean room may provide features allowing thorough disinfection of the clean room without damage to the clean room or to the surrounding building. For example, the walls, floor, ceiling, junctions, and penetrations of the walls, floors or ceiling may be constructed to allow the operator to apply powerful chemical cleaners and disinfectants to the clean room surfaces without damage to the clean room structure and without escape of those powerful cleaners and disinfectants to the building envelope.

The pharmaceutical or electronics research or production use of the clean room may require the use of gases such as nitrogen, oxygen, hydrogen, argon, silane, halides, helium, or other gases. In the prior art clean room, gas may be stored in compressed gas cylinders in the clean room and piped directly from the cylinders. Storing gas in the clean room occupies valuable clean room space and creates issues with cleaning and disinfecting the compressed gas cylinders and associated fittings and piping. Alternatively, the prior art clean room may be provided with gas fittings penetrating the clean room wall and with the gas supply located outside of the clean room. Installation of a prior art gas fitting penetrating the clean room wall requires drilling a hole through the clean room wall, installation of the gas fitting penetrating the hole and connection of the back side of the gas fitting to gas piping located on the outside of the clean room wall. The location of the piping on the outside of the clean room wall is unsightly and reduces the utility of the outside of the clean room wall for other uses.

II. SUMMARY OF THE INVENTION

The Invention is a structural and modular gas utility raceway that forms a part of the inside and outside surfaces of the wall of a clean room. The modular gas raceway supplies gases for use in research or manufacturing operations within the clean room. The modular gas utility raceway may be installed at any location within the clean room, such as between adjacent clean room components such as wall panels, clean room corners, clean room doors, electrical utility raceways or any other clean room component. The modular gas utility raceway is interchangeable with other utility raceways, such as electrical or vacuum utility raceways, for predictable and flexible design and installation.

The gas utility raceway comprises a box-shaped vertically-oriented beam. The vertically oriented beam may comprise two box sections for additional strength. The two box sections may be defined by a single aluminum extrusion. The gas utility raceway may be physically robust and may reinforce the assembled clean room wall and assist in supporting the clean room ceiling, which may allow the wall panels and other clean room components to be thinner and lighter than would otherwise be the case.

As described in more detail below, the raceway defines a beam top end, a beam bottom end, a front face, a back face and left and right sides. The front face may be visible from inside the completed clean room and the back face may be visible from outside the clean room. The beam top end may extend through the clean room ceiling to vent the interior volume of the box-shaped beam to the atmosphere outside the clean room. The beam bottom end is configured to engage a floor track that defines the bottom portion of the clean room wall and that locates the wall panels, the gas utility raceway and the other clean room components. The left and right sides are configured to engage adjacent clean room components.

The interior volume of the gas utility raceway may include a plurality of gas pipes. Each of the gas pipes terminates at its lower end at a gas outlet located on the front face of the raceway. Each of the gas outlets may include a valve assembly. The valve assembly may include a regulator, a valve, such as a rotary manual valve, a gas pressure gauge, such as a dial gauge, and a valve connector. The purpose of the valve assembly is to control and monitor the delivery of gas by a person located inside the clean room.

The beam top end is open to the atmosphere above the clean room ceiling. The beam top end is open so that any gas leak that occurs on the upstream side of the valve assembly is vented outside of the clean room for increased safety to persons inside the clean room. Each of the gas pipes on the interior volume of the raceway terminates at its upper end proximal to the open top of the raceway at a connector. Each connector is configured for connection to gas plumbing located above the ceiling of the clean room. The beam top end may include a support bracket. The support bracket extends above the beam top end and above the clean room ceiling so as not to block the open beam top end. The support bracket engages and provides structural support to the gas pipes extending through the raceway to avoid undue stress on the piping located within the raceway, on the valve assembly, and on the connectors.

The left and right sides of the raceway are configured to engage adjacent clean room wall components in a gas- and liquid-tight junction. As used herein, the term 'clean room component' includes wall panels, doorways, corners, other utility raceways, or any other clean room wall component. The gas- and liquid-tight junction comprises a slot defined by the left or right side of the raceway and a corresponding slot defined by the adjacent clean room component. When the raceway and clean room components are joined, a spline occupies both slots and physically connects the raceway to the adjoining components, providing structural stability to the assembled wall and providing a gas and liquid-tight barrier.

The gas- and liquid-tight junction is also defined by the shape of the left and right sides of the raceway and the mating side of the adjacent clean room components. The corners of the left and right sides extend further toward the adjacent clean room component than does the center portion of the left and right sides of the raceway, so that when the raceway engages the adjacent clean room components the corners of the raceway physically touch the corresponding corners of the adjacent clean room components and the center portion of the left and right sides of the raceway do not touch the corresponding portion of the adjacent clean room component. The outside surface of the raceway has a polymer coating, such as a vinyl coating, as does the outside surface of the adjacent clean room component. The touching corners of the assembled raceway and clean room components may be solvent-welded at the time of assembly of the clean room, providing the gas- and liquid-tight seal of the junction between the raceway and the clean room component.

In solvent welding, an organic solvent is applied to the junction between the raceway and the wall panel. The solvent dissolves the polymer coating on both the raceway and the clean room component. When the solvent evaporates, the polymer coating is continuous across the junction. Because the solvent weld occurs at the touching corners, the joint between the raceway and clean room component does not define crevices in which contaminants, moisture or microorganisms may survive cleaning and disinfection of the clean room. The solvent-welded junction is also attractive. An observer will see only a shallow groove between the solvent-welded raceway and adjacent clean room component.

IV. DETAILED DESCRIPTION OF AN EMBODIMENT

Figure 1:
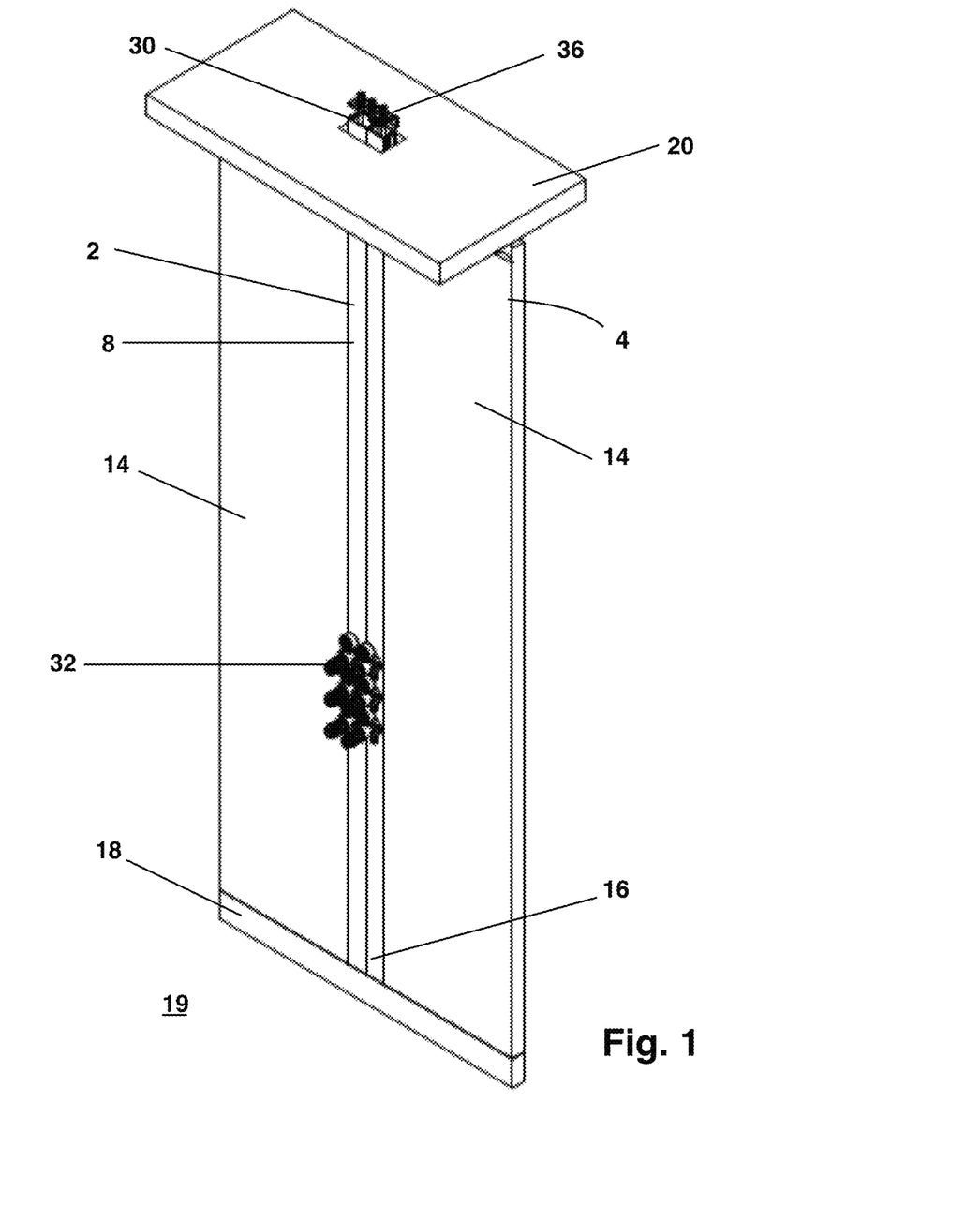
FIG. 1 is a perspective view of the modular gas utility raceway installed in a clean room.
Figure 2:
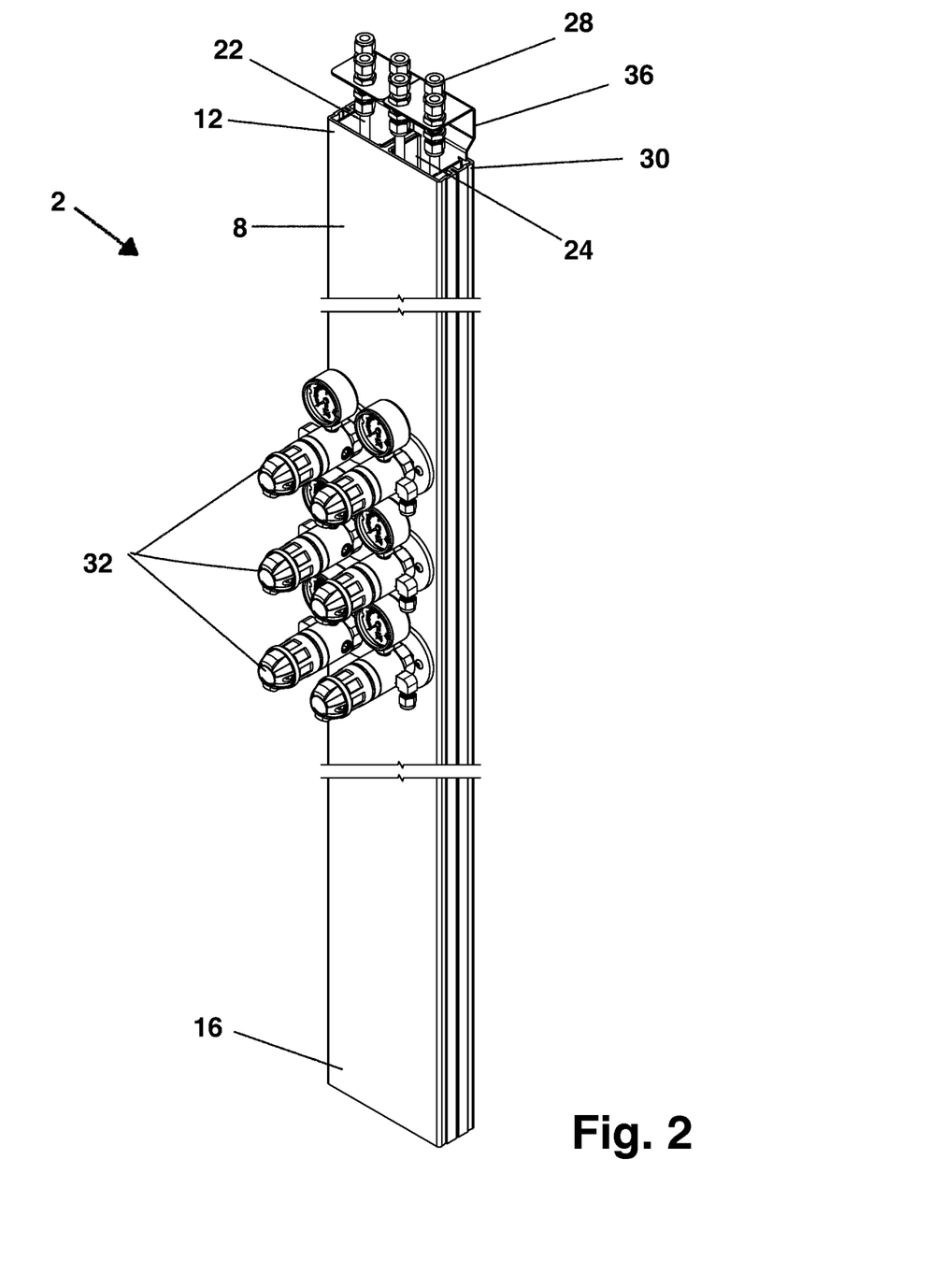
FIG. 2 is a perspective of the modular gas utility raceway.

FIG. 1 is a perspective view of the modular gas utility raceway 2 installed in the wall 4 of a clean room 6. FIG. 2 is the modular gas utility raceway 2 prior to installation in the clean room wall 4. From FIGS. 1 and 2, the modular gas utility raceway 2 comprises a vertically-oriented box-shaped beam 8 that may comprise two box sections 10 and that may be composed of a single aluminum extrusion 12. As shown by FIG. 1, the modular gas utility raceway 2 joins adjoining clean room components 14 on either side to define the clean room 6 wall. Also as shown by FIG. 1, the beam bottom end 16 of the modular gas utility raceway 2 is supported by a floor rail 18. The modular utility raceway 2 in turn reinforces the clean room wall 4 and may support the clean room ceiling 20.

Figure 3:
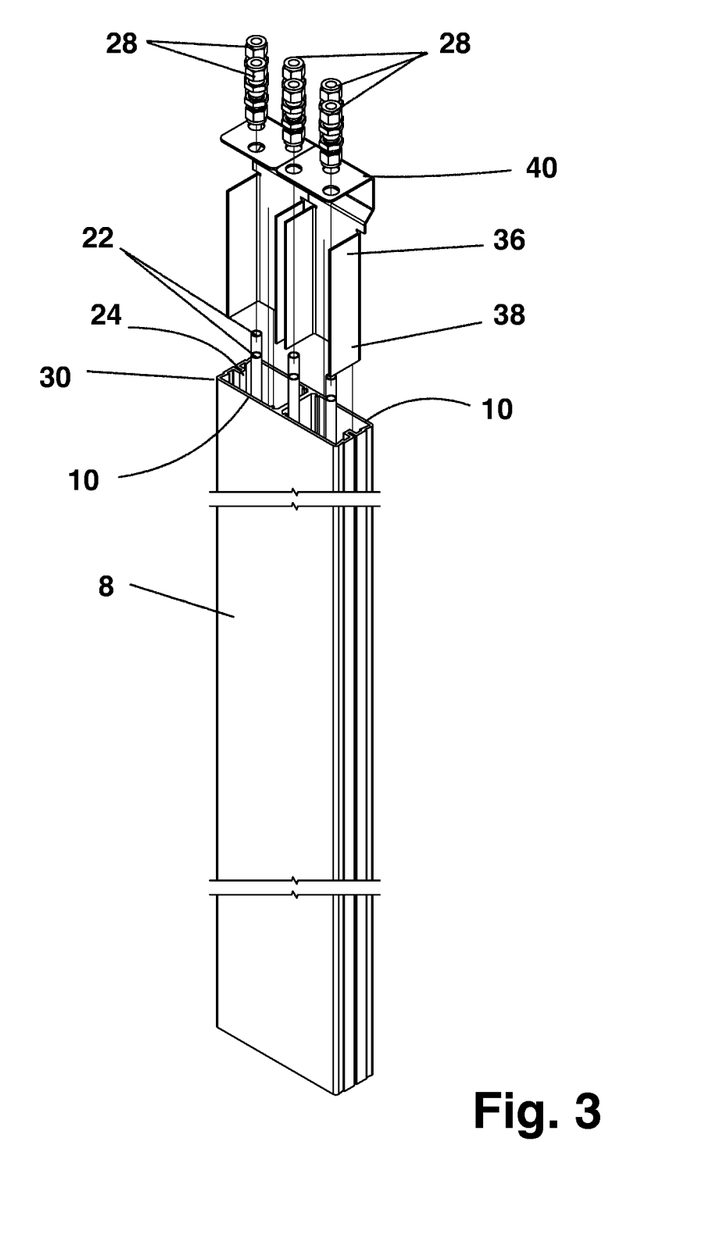
FIG. 3 is a detail perspective view of the beam top end of the modular gas utility raceway.

From FIGS. 1, 2 and 3, pipes 22 to convey gas are located within the interior volume 24 of the box-shaped beam 8. Each pipe 22 extends from a connector 28 located proximal to the beam top end 30 to a valve assembly 32 that penetrates front face 34 of the box-shaped beam 8. Each pipe 22 and each connector 28 is supported by a support bracket 36 above the open beam top end 30. As noted above, the box-shaped beam 8 is open at the top so that any gas leakage from failure of a connector 28 or plumbing upstream of the valve assembly 32 is vented to the atmosphere outside the clean room 6 for the safety of the clean room 6 occupants.

Figure 8:
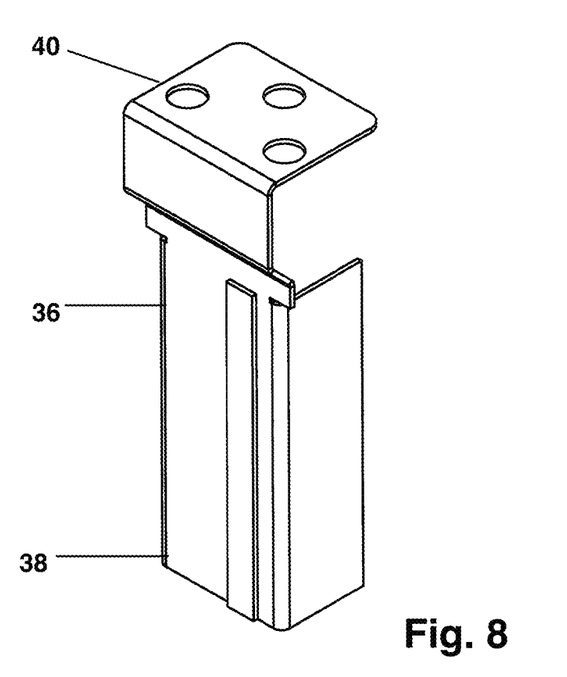
FIG. 8 is a perspective view of the support bracket.

FIG. 3 and FIG. 8 show the support bracket 36. The support bracket 36 has a bracket lower end 38 and a bracket upper end 40. The bracket lower end 38 is configured to slide into the open beam top end 30. The bracket upper end 40 is configured to support the connectors 28 and pipes 22. The support bracket 36 upper end 40 is in a spaced-apart relation to the beam top end 30 when the support bracket 36 is installed on the box-shaped beam 8 to ensure that the beam top end 30 remains open. As shown by FIG. 1, the bracket upper end 40 extends above the level of the clean room ceiling 20, discouraging a user from placing materials on the clean room 6 ceiling that might block the open top 30 of the box-shaped beam 8.

Figure 4:
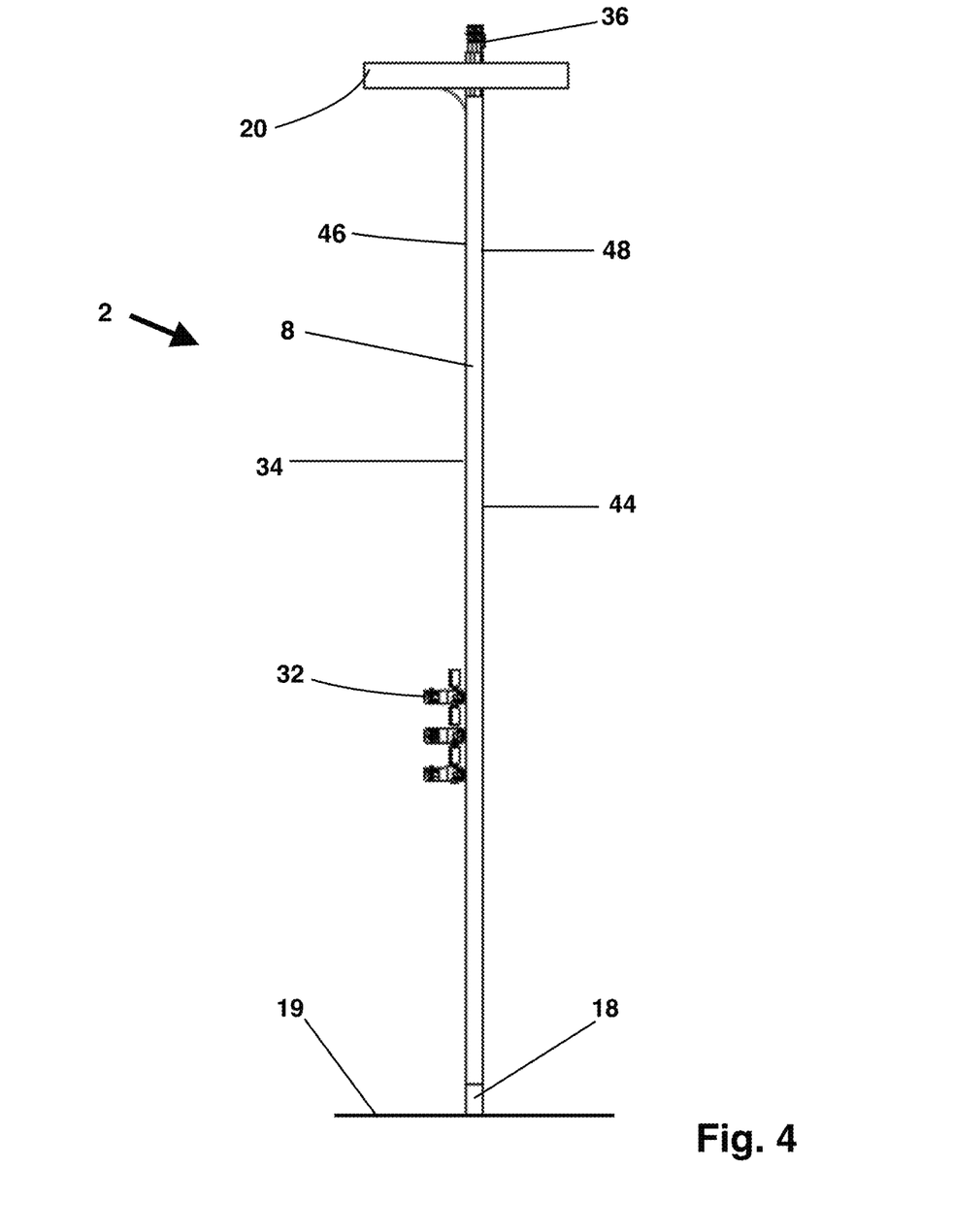
FIG. 4 is a side view of the modular gas utility raceway installed in a clean room wall.

FIG. 4 is a side view of the modular gas utility raceway 2 installed in a clean room 6. From FIG. 4, the modular gas utility raceway 2 defines a front face 34 and a back face 44. The front face 34 of the box-shaped beam 8, in cooperation with the other clean room components 14, defines the clean room wall inside surface 46, which may be visible to a person inside the clean room 6. The back face 44 of the raceway 2, in cooperation with the clean room components 14 and the other clean room 6 components defines the outside surface 48 of the clean room 6, which may be visible to a person outside the clean room 6. The piping and connectors 28 inside the box-shaped beam 8 are hidden from view and are visible neither to persons inside nor outside the clean room 6.

Figure 5:
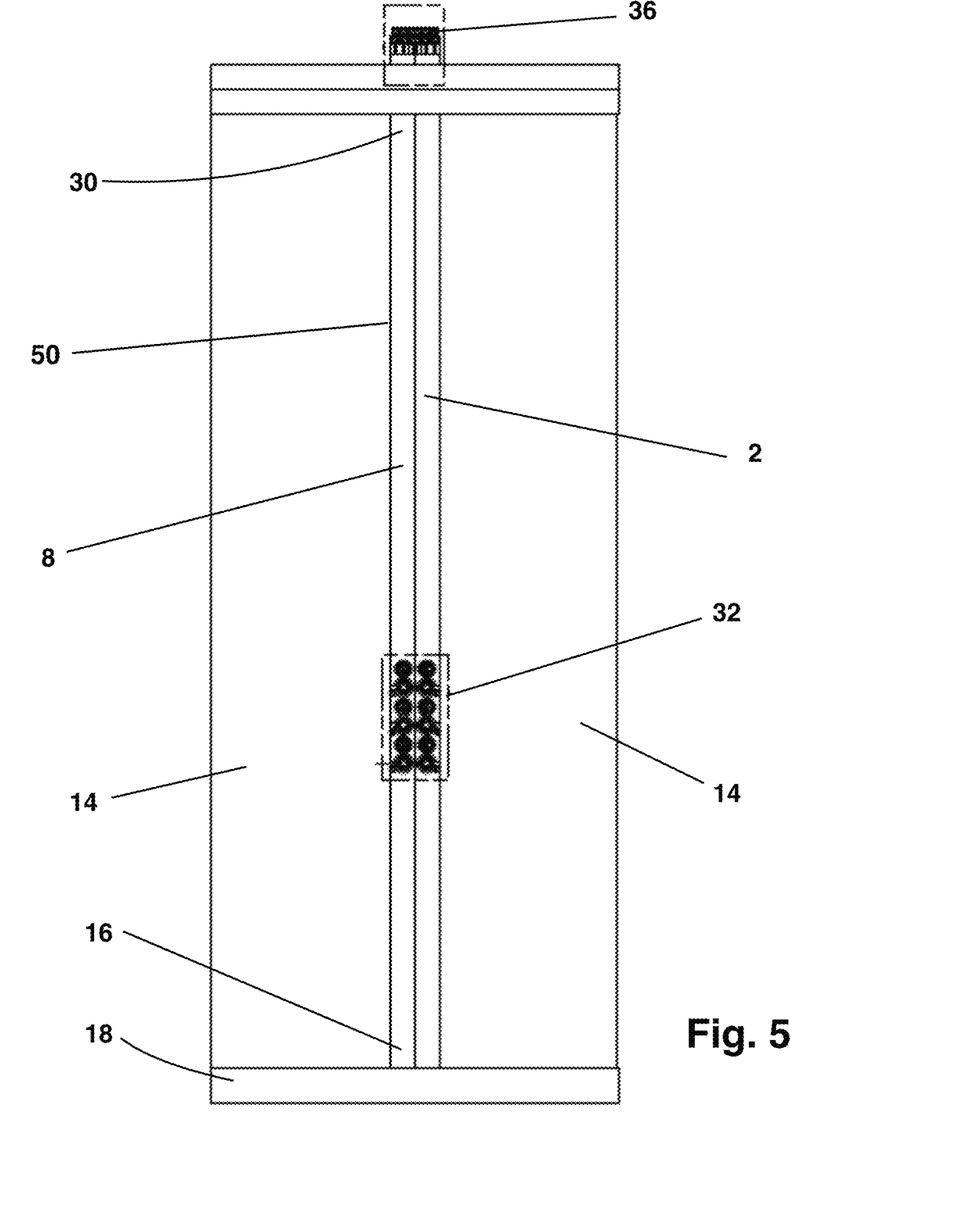
FIG. 5 is a front view of the modular gas utility raceway installed in a clean room wall.

From FIG. 5 is a front view of the modular gas utility raceway 2 installed in the wall 4 of a clean room 6. In the example of FIG. 5, clean room components 14, which may be composite wall panels, are disposed on the left side 52 and right side 54 of the modular gas utility raceway 2 to define the clean room wall 4. The gas utility raceway 2 also may engage other clean room 6 components to define the clean room 6 wall, such as door frames, corners, windows, or other utility raceways such as modular gas, electrical or vacuum raceways.

Figure 6:
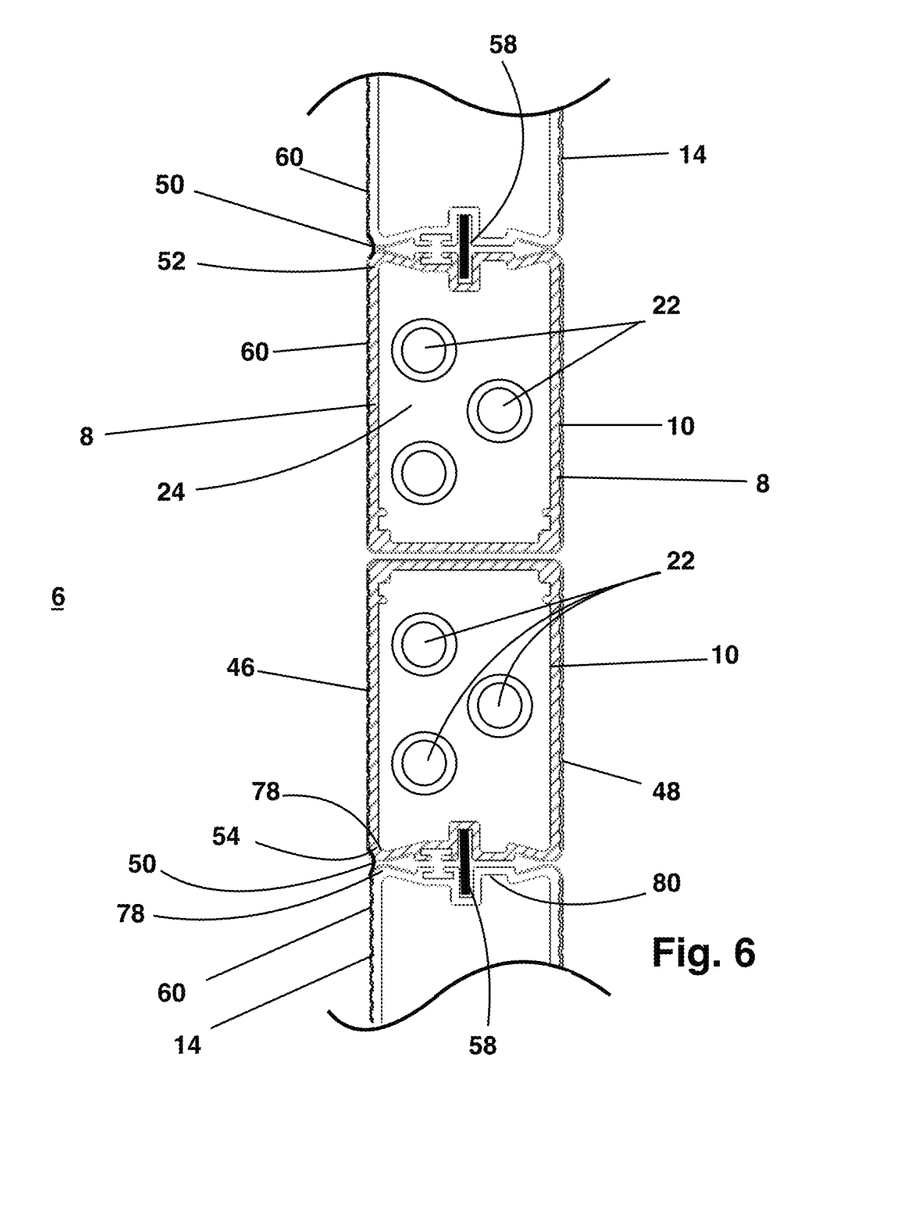
FIG. 6 is a detail sectional view of the top portion of the modular gas utility raceway installed in a clean room wall.

FIG. 6 is a cross section of the modular gas raceway 2 installed in the clean room wall 4. The section of FIG. 6 is above the level of the valve assemblies 32. In this instance, the box-shaped beam 8 defines two box-shaped sections 10 and each of the box-shaped sections 10 contains three pipes 22, corresponding to a total of six valve assemblies 32 penetrating the front face 34 of the modular gas raceway 2. FIG. 6 demonstrates the gas and liquid tight junction 50 between the left and right sides 52, 54 of the modular gas raceway 2 and the adjoining clean room components 14. The left side 52 and right sides 54 of the box-shaped beam 8 each defines a slot 56. The adjoining clean room components 14 each defines a corresponding slot 56. A spline 58 is disposed in the corresponding slots 56, structurally joining the modular gas raceway 2 and the adjoining clean room components 14. The splines 58 also provide a gas and liquid resistant connection. The box-shaped beam 8 and the adjoining clean room components 14 are coated with a polymer 60, as described above. The corners 78 of the modular gas raceway 2 are slightly proud of the center portion 80 of the left and right sides 52, 54 of the box-shaped beams 8 and the center portion 80 of the adjoining clean room components 14. When the left and right sides 52, 54 of the modular gas raceway 2 are placed in engagement with the corresponding sides of the adjoining clean room components 14, the corners 78 physically touch, but the center portions 80 of the box-shaped beam 8 and the clean room components 14 do not physically touch. The polymer 60 coating the modular gas raceway 2 and the clean room components 14 is solvent-welded during installation by applying a solvent to the junction 50 between adjacent corners 78. The solvent melts the polymer 60 and then evaporates, depositing the polymer 60 across the junction 50 and sealing the junction 50 so that the junction 50 is gas and liquid-tight. A person observing the junction 50 sees only a shallow groove.

Figure 7:
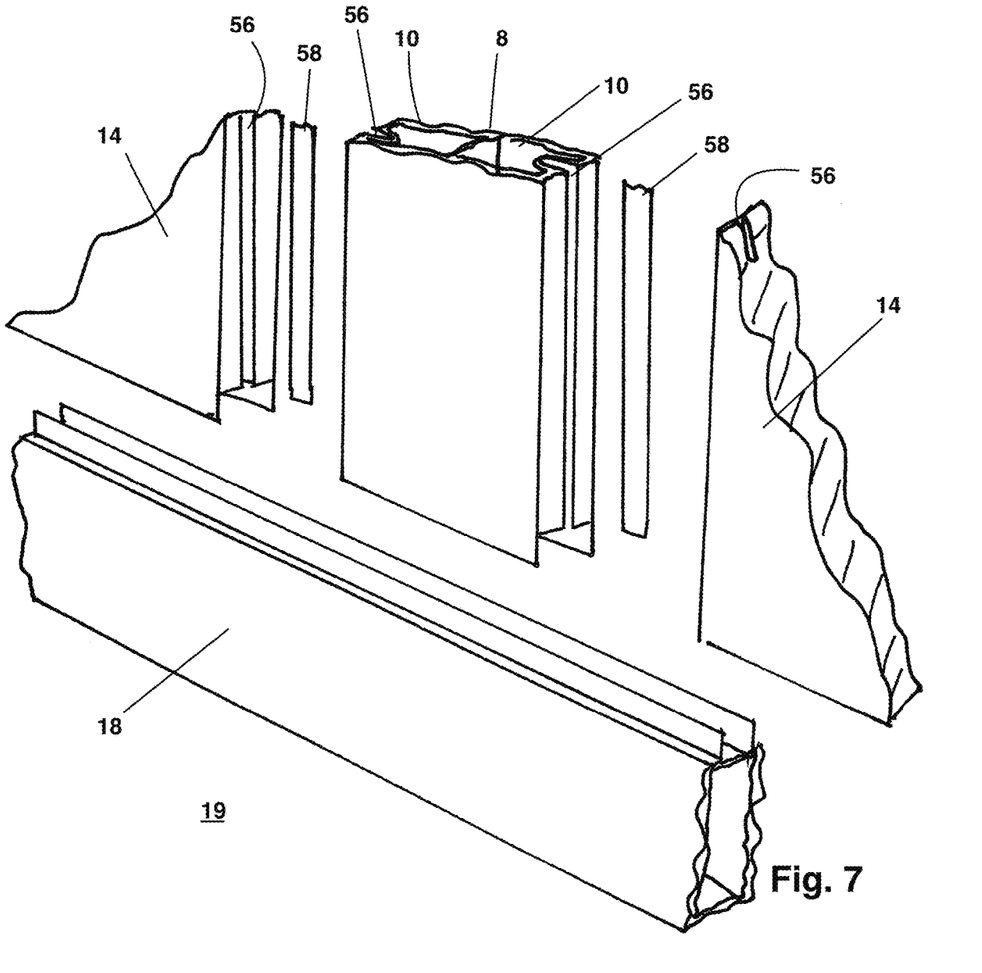
FIG. 7 is an exploded detail view of the beam bottom end of the modular gas utility raceway.

FIG. 7 illustrates the floor rail 18 and mounting system for anchoring the modular gas utility raceway 2 and clean room components 14 to the floor 19 of the clean room 6. To construct the clean room 6, a floor rail 18 is attached to the clean room floor 19 at the desired location of the clean room wall 4. A U-shaped member is attached to the floor rail 18. The modular gas utility raceway 2 and the clean room components 14 each defines an opening that receives and engages the U-shaped member, locating the raceway 2 or wall 4 panel with respect the floor 19 of the clean room 6. Splines 58 are placed in the corresponding slots 56 and the clean room components 14 and modular gas raceway 2 are moved into engagement. The joints between the modular gas utility raceway 2, adjoining clean room components 14 and floor rail 18 are solvent-welded, sealing the joints and the clean room 6 walls.

Figure 9:
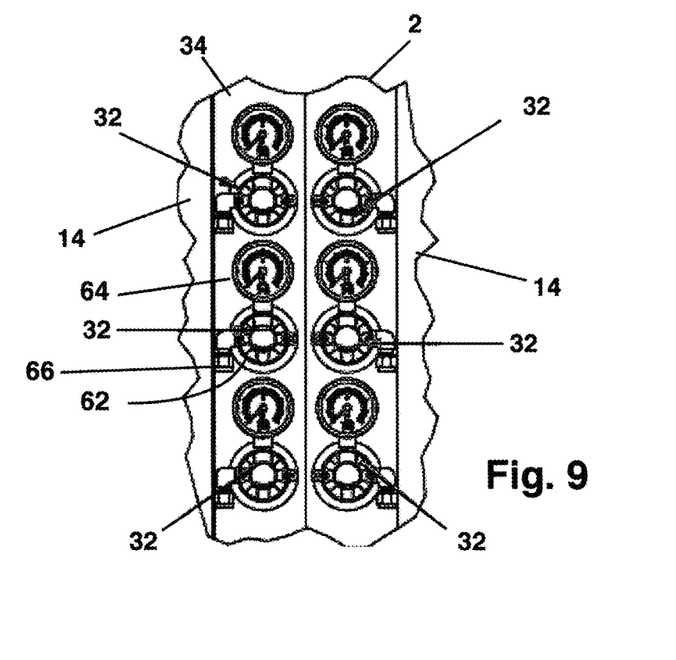
FIG. 9 is a detail front view of the valve assemblies.
Figure 10:
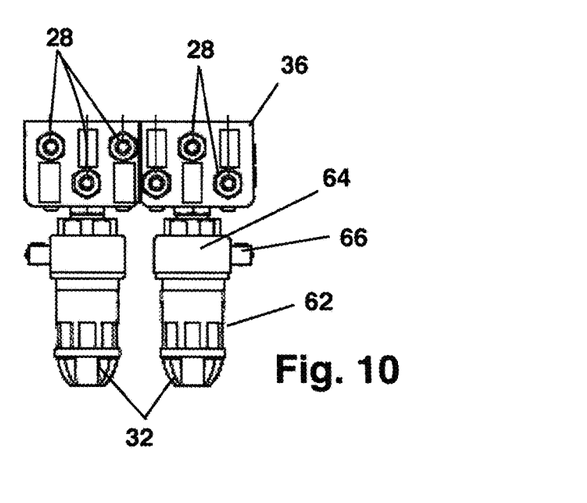
FIG. 10 is a top view of the modular gas utility raceway.

FIG. 9 is a detail front view of the valve assemblies 32, in this instance six valve assemblies 32 located on the face of the modular gas utility raceway 2. Each of the valve assemblies 32 may include a rotary manual valve 62, a dial pressure gauge 64, an inside connector 66 and a regulator, all of which are accessible from inside the clean room 6. A user inside the clean room 6 therefore may control the connection and flow of gas through the valve assembly 32. FIG. 10 is a top view of modular gas utility raceway 2 showing six connectors 28 on the bracket upper end 40 and showing the valve assemblies 32 in top view.

Figure 11:
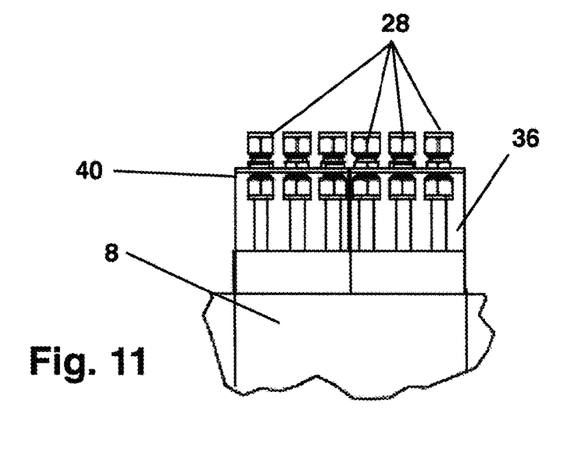
FIG. 11 is a detail front view of to the connectors engaging the support bracket

FIG. 11 is a detail front view of the support bracket 36 at the beam top end 30 of the modular gas utility raceway 2 with the connectors 28 and pipes 22 in place, all as described above.

Figure 12:
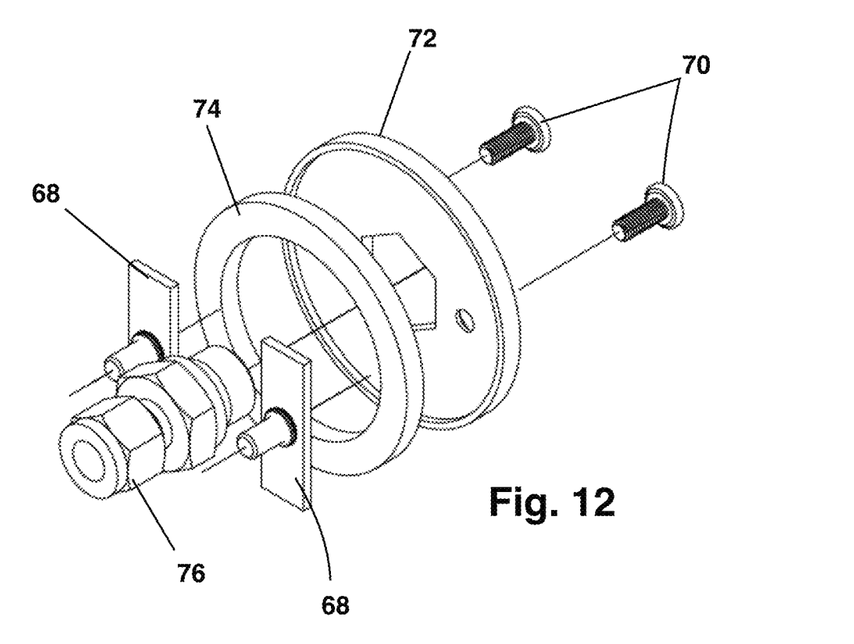
FIG. 12 is a perspective exploded view of the apparatus for mounting the valve assembly to the front face of the box-shaped beam.

FIG. 12 is an exploded perspective view of the mounting for the valve assembly 32 at the penetration through the front face 34 of the box-shaped beam 8. Nuts 68 are disposed in the interior volume 24 of the box-shaped beam 8. Machine screws 70 secure a fascia 72 and gasket 74 to the front face 34 of the box-shaped beam 8 for a gas and liquid-tight seal. A valve connector 76 may be attached to the fascia 72. The valve connector 76 is configured to connect a pipe 22 located within the box-shaped beam 8 to the valve assembly 32. The valve connector 76 may be connected to the fascia 72 by any mechanism known in the art; for example, welding, brazing, adhesives, clamping, or the use of fasteners.

The modular gas utility raceway 2 may be constructed at a remote location, such as a factory, and assembled with other clean room components at the site of the clean room 6.

The following are numbered elements in the specification and drawings:

modular gas utility raceway 2
wall 4
clean room 6
a box-shaped vertically-oriented box-shaped beam 8
two box sections 10
a single aluminum extrusion 12
clean room wall component 14
beam bottom end 16
floor rail 18
floor 19
clean room ceiling 20
pipes 22
interior volume 24 of the box-shaped beam 8
connector 28
beam top end 30
valve assembly 32
front face 34 of the box-shaped beam 8
support bracket 36
bracket lower end 38
bracket upper end 40
a back face 44 of the box-shaped beam 8
clean room wall inside surface 46
clean room wall outside surface 48
gas and liquid-tight junction 50
left side 52
right side 54
slot 56
spline 58
polymer 60
a rotary manual valve 62
a dial pressure gauge 64
inside connector 66
nuts 68
machine screws 70
fascia 72
gasket 74
valve connector 76
corner 78
center portion 80

We claim:

1. A modular gas utility raceway for a clean room, the clean room defining a wall, a ceiling and a clean room interior, the wall having an inside surface, the gas utility raceway comprising:

a) a box-shaped beam having a front face, the box shaped beam having a configuration for incorporation into the wall of the clean room so that the front face coincides with the inside surface of the clean room wall;
b) at least one pipe, the pipe being configured to convey a compressed gas, the box-shaped beam defining an interior volume, the pipe being disposed within the interior volume, the pipe defining a pipe top end and a pipe bottom end;
c) at least one valve assembly, the at least one valve assembly being in fluid communication with the at least one pipe and configured to selectably convey the compressed gas from the pipe through the front face of the box-shaped beam and into the clean room interior;
d) the box-shaped beam defining a beam top end, the at least one pipe communicating through the beam top end;
e) at least one connector, the at least one connector being attached to the at least one pipe and configured to operably attach the at least one pipe to a compressed gas plumbing above the ceiling of the clean room.

2. The modular gas utility raceway of claim 1 wherein the beam top end is open so that a gas within the interior volume of the box-shaped beam communicates above the clean room ceiling with air outside of the clean room when the gas utility raceway is incorporated into the wall of the clean room, the front face of the box-shaped beam segregating the interior volume of the box-shaped beam from the clean room interior when the box-shaped beam is incorporated into the clean room wall so that the interior volume of the box-shaped beam is not in fluid communication with the clean room interior.

3. A modular gas utility raceway for a clean room, the clean room defining a wall and a ceiling, the wall having an inside surface, the gas utility raceway comprising:
a) a box-shaped beam having a front face, the box shaped beam having a configuration for incorporation into the wall of the clean room so that the front face coincides with the inside surface of the clean room wall, wherein the beam top end is open so that a gas within the interior volume of the box-shaped beam communicates above the clean room ceiling with air outside of the clean room when the gas utility raceway is incorporated into the wall of the clean room;
b) at least one pipe, the pipe being configured to convey a gas, the box-shaped beam defining an interior volume, the pipe being disposed within the interior volume, the pipe defining a pipe top end and a pipe bottom end;
c) at least one valve assembly, the at least one valve assembly being in fluid communication with the at least one pipe through the front face of the box-shaped beam;
d) the box-shaped beam defining a beam top end, the at least one pipe communicating through the beam top end;
e) at least one connector, the at least one connector being attached to the at least one pipe and configured to operably attach the at least one pipe to a gas plumbing above the ceiling of the clean room;
f) a support bracket, the support bracket engaging the beam top end, the support bracket engaging the at least one connector and the at least one pipe to support the at least one connector and at least one pipe above the open beam top end.

4. The modular gas utility raceway of claim 3 wherein the ceiling defines a ceiling top, the support bracket extending above the ceiling top when the modular gas utility raceway is incorporated into the wall of the clean room whereby the support bracket discourages a user from blocking the open top of the box-shaped beam.

5. The modular gas utility raceway of claim 4 wherein the box-shaped beam defines a beam bottom end, the beam bottom end being configured to engage a floor rail when the modular gas utility raceway is incorporated into a clean room wall, the floor rail defining a location of the wall on a clean room floor.

6. The modular gas utility raceway of claim 5 wherein the configuration of the box-shaped beam to be incorporated into the wall comprises: the box-shaped beam defines a left and a right side, the left and right sides each defining box-shaped beam corners and a box-shaped beam center portion, the box-shaped beam corners being proud of the box shaped beam center portion, the box shaped beam center portion defining a slot, the box-shaped beam corners, center portion and slot corresponding to wall component corners, wall component center portions, and wall component slots of wall components disposed adjacent to the left and right sides of the box-shaped beam, the corresponding box-shaped beam slots and corresponding wall component slots being configured to receive splines mechanically connecting the box-shaped beam and the adjacent wall components when the box-shaped beam and adjacent wall components are in engagement, the corresponding box-shaped beam corners and wall components corners touching when the box-shaped beam and adjacent wall components are in engagement, the box-shaped beam and adjacent wall components having a polymer coating, the polymer coating being solvent weldable to seal a junction between the box-shaped beam and an adjacent wall component.

7. A clean room system for a clean room having a clean room interior, the clean room system comprising:
a) a modular gas utility raceway, the modular gas utility raceway including a box-shaped beam having a front face, the box shaped beam having a configuration for incorporation into a wall of the clean room so that the front face coincides with an inside surface of the clean room wall, the box-shaped beam defining an interior volume, the interior volume containing at least one pipe, the pipe being configured to convey a compressed gas, the pipe being disposed within the interior volume, the pipe defining a pipe top end and a pipe bottom end, at least one valve assembly in fluid communication with the at least one pipe and configured to selectably convey the compressed gas from the pipe through the front face of the box-shaped beam and into the clean room interior, the box-shaped beam defining a beam top end, the at least one pipe communicating through said beam top end, at least one connector, the at least one connector being attached to the at least one pipe and configured to operably attach the at least one pipe to a compressed gas plumbing above a ceiling of the clean room, the box-shaped beam defining a left side and a right side;
b) a first wall component and a second wall component configured to engage the left side and the right side of the box-shaped beam, the first and second wall component and the modular gas utility raceway in cooperation comprising the clean room wall; and
c) a clean room ceiling configured to be located above the clean room wall.

8. The clean room system of claim 7 wherein the beam top end is open so that a gas within the interior volume of the box-shaped beam communicates above the clean room ceiling with air outside of the clean room when the gas utility raceway is incorporated into the clean room wall, the front face of the box-shaped beam segregating the interior volume of the box-shaped beam from the clean room interior when the box-shaped beam is incorporated into the clean room wall so that the interior volume of the box-shaped beam is not in fluid communication with the clean room interior.

9. A clean room system, the clean room system comprising:
   a) a modular gas utility raceway, the modular gas utility raceway including a box-shaped beam having a front face, the box shaped beam having a configuration for incorporation into a wall of the clean room so that the front face coincides with an inside surface of the clean room wall, the box-shaped beam defining an interior volume, the interior volume containing at least one pipe, the pipe being configured to convey a gas, the pipe being disposed within the interior volume, the pipe defining a pipe top end and a pipe bottom end, at least one valve assembly in fluid communication with the at least one pipe through the front face of the box-shaped beam, the box-shaped beam defining a beam top end, the at least one pipe communicating through said beam top end, at least one connector, the at least one connector being attached to the at least one pipe and configured to operably attach the at least one pipe to a gas plumbing above a ceiling of the clean room, the box-shaped beam defining a left side and a right side, wherein the beam top end is open so that a gas within the interior volume of the box-shaped beam communicates above the clean room ceiling with air outside of the clean room when the gas utility raceway is incorporated into the clean room wall;
   b) a first wall component and a second wall component configured to engage the left side and the right side of the box-shaped beam, the first and second wall component and the modular gas utility raceway in cooperation comprising the clean room wall; and
   c) a clean room ceiling configured to be located above the clean room wall;
   d) a support bracket engaging the beam top end, the support bracket engaging the at least one connector and the at least one pipe to support the at least one connector and at least one pipe above the beam top end and above the clean room ceiling.

10. The clean room system of claim 9 wherein the clean room ceiling defines a ceiling top, the support bracket extending above the ceiling top when the modular gas utility raceway is incorporated into the wall of the clean room whereby the support bracket discourages a user from blocking the open beam top of the box-shaped beam.

11. The clean room system of claim 10 wherein the box-shaped beam defines a beam bottom end, the beam bottom end being configured to engage a floor rail when the modular gas utility raceway is incorporated into the clean room wall, the floor rail defining a location of the wall on a clean room floor.

12. The clean room system of claim 11 wherein the left and right sides of the box-shaped beam each defining a pair of box-shaped beam corners and a box-shaped beam center portion, the box-shaped beam corners being proud of the box shaped beam center portion, the box shaped beam center portion defining a slot, the box-shaped beam corners, center portion and slot corresponding to wall component corners, wall component center portions, and wall component slots of wall components disposed adjacent to the left and right sides of the box-shaped beam, the corresponding box-shaped beam slots and corresponding wall component slots being configured to receive splines to mechanically connect the box-shaped beam and the adjacent wall components when the box-shaped beam and adjacent wall components are in engagement, the corresponding box-shaped beam corners and wall components corners touching to define a pair of junctions when the box-shaped beam and adjacent wall components are in engagement, the box-shaped beam and adjacent wall components having a polymer coating, the polymer coating being solvent weldable to seal the junctions between the box-shaped beam and the adjacent wall components.

13. A method of constructing a clean room defining a clean room wall, the wall having an inside surface, the method comprising the steps of:
   a) providing a modular gas utility raceway, the modular gas utility raceway having a box-shaped beam defining a front face, the box-shaped beam defining an interior volume, the interior volume containing at least one pipe, the pipe being configured to convey a compressed gas, the pipe being disposed within the interior volume, the pipe defining a pipe top end and a pipe bottom end, at least one valve assembly, the at least one valve assembly being in fluid communication with the at least one pipe and configured to selectably convey the compressed gas from the pipe through the front face of the box-shaped beam and into the clean room interior the box-shaped beam defining a beam top end, the at least one pipe communicating through said beam top end, at least one connector, the at least one connector configured for attachment to a compressed gas plumbing above a ceiling of the clean room, the box-shaped beam defining a left side and a right side;
   b) providing a first wall component and a second wall component configured to engage the left side and the right side of the box-shaped beam;
   c) engaging the first wall component with the left side of the box-shaped beam and the second wall component with the right side of the box-shaped beam, the box-shaped beam and the first and second wall components in cooperation comprising the clean room wall, the front face of the box-shaped beam coinciding with an inside surface of the clean room wall; and
   d) assembling the clean room ceiling above the clean room wall, the at least one connector being located above the clean room ceiling;
   e) attaching the connector to the gas plumbing above the clean room ceiling.

14. The method of claim 13 wherein the box-shaped beam top end is open so that a gas within the interior volume of the box-shaped beam communicates above the clean room ceiling with air outside of the clean room, the front face of the box-shaped beam segregating the interior volume of the box-shaped beam from the clean room interior when the box-shaped beam is incorporated into the clean room wall so that the interior volume of the box-shaped beam is not in fluid communication with the clean room interior.

15. A method of constructing a clean room defining a clean room wall, the wall having an inside surface, the method comprising the steps of:
   a) providing a modular gas utility raceway, the modular gas utility raceway having a box-shaped beam defining a front face, the box-shaped beam defining an interior volume, the interior volume containing at least one pipe, the pipe being configured to convey a gas, the pipe being disposed within the interior volume, the pipe defining a pipe top end and a pipe bottom end, at least one valve assembly, the at least one valve assembly being in fluid communication with the at least one pipe through the front face of the box-shaped beam, the box-shaped beam defining a beam top end, the at least one pipe communicating through said beam top end, at least one connector, the at least one connector being attached to the at least one pipe and configured to operably attach the at least one pipe to a gas plumbing above a ceiling of the clean room, the box-shaped beam defining a left side and a right side, wherein the box-shaped beam top end is open so that a gas within the interior volume of the box-shaped beam communicates above the clean room ceiling with air outside of the clean room;

b) providing a first wall component and a second wall component configured to engage the left side and the right side of the box-shaped beam;

c) engaging the first wall component with the left side of the box-shaped beam and the second wall component with the right side of the box-shaped beam, the box-shaped beam and the first and second wall components in cooperation comprising the clean room wall, the front face of the box-shaped beam coinciding with an inside surface of the clean room wall;

d) assembling the clean room ceiling above the clean room wall, the at least one connector being located above the clean room ceiling;

e) attaching the connector to the gas plumbing above the clean room ceiling;

f) a support bracket, the support bracket engaging the beam top end of the box-shaped beam, the support bracket engaging the at least one connector and the at least one pipe to support the at least one connector and at least one pipe above the open box-shaped beam top end.

16. The method of claim 15 wherein the ceiling defines a ceiling top, the support bracket extending above the ceiling top when the modular gas utility raceway is incorporated into the wall of the clean room whereby the support bracket discourages a user from blocking the open top of the box-shaped beam.

17. The method of claim 16 wherein the box-shaped beam defines a beam bottom end, the beam bottom end being configured to engage a floor rail when the modular gas utility raceway is incorporated into a clean room wall, the floor rail defining a location of the wall on a clean room floor.

18. The method of claim 17 wherein the left and right sides of the box-shaped beam each defining a pair of box-shaped beam corners and a box-shaped beam center portion, the box-shaped beam corners being proud of the box shaped beam center portion, the box shaped beam center portion defining a slot, the box-shaped beam corners, center portion and slot corresponding to wall component corners, wall component center portions, and wall component slots of the first and second wall components disposed adjacent to the left and right sides of the box-shaped beam, the corresponding box-shaped beam slots and corresponding wall component slots being configured to receive splines mechanically connecting the box-shaped beam and the adjacent first and second wall components when the box-shaped beam and first and second wall components are in engagement, the corresponding box-shaped beam corners and wall components corners touching to define a pair of junctions when the box-shaped beam and first and second wall components are in engagement, the box-shaped beam and adjacent wall components having a polymer coating, the polymer coating being solvent weldable to seal the junctions between the box-shaped beam and the first and second wall components, the step of engaging the box-shaped beam and the first and second wall components further comprising:

a) placing the left and right sides of the box-shaped beam corners in engagement with the corresponding first and second wall component corners and with the splines disposed in the corresponding slots; and b) solvent-welding the junctions between the box-shaped beam corners and the first and second wall component corners.

* * * * *